United States Patent [19]

Mino et al.

[11] 4,129,708

[45] Dec. 12, 1978

[54] POLYACRYLATE ELASTOMER COMPOSITIONS

[75] Inventors: Guido Mino, Murray Hill; Rudolf A. Behrens, Gladstone, both of N.J.

[73] Assignee: American Cyanamid Company, Stamford, Conn.

[21] Appl. No.: 840,194

[22] Filed: Oct. 7, 1977

Related U.S. Application Data

[63] Continuation of Ser. No. 788,172, Apr. 18, 1977, which is a continuation of Ser. No. 683,610, May 5, 1976, abandoned, which is a continuation of Ser. No. 615,873, Sep. 22, 1975, abandoned, which is a continuation of Ser. No. 452,318, Mar. 18, 1974, abandoned, which is a continuation of Ser. No. 287,305, Sep. 8, 1972, abandoned, which is a continuation-in-part of Ser. No. 119,963, Mar. 1, 1971, abandoned.

[51] Int. Cl.$^{2}$ .......................... C08F 4/04; C08F 4/32; C08F 4/40

[52] U.S. Cl. .................................... 526/218; 260/879; 526/30; 526/52.5; 526/229; 526/231; 526/292; 526/323; 526/329; 526/334

[58] Field of Search ................ 260/879; 526/229, 329, 526/231, 218, 292, 323, 334, 52.5, 30

[56] References Cited

U.S. PATENT DOCUMENTS

| | | | |
|---|---|---|---|
| 3,644,584 | 2/1972 | Fryd | 260/879 |
| 3,749,755 | 7/1973 | Bronstert et al. | 260/876 R |
| 3,833,688 | 9/1974 | Abolins et al. | 260/879 X |

FOREIGN PATENT DOCUMENTS

| | | | |
|---|---|---|---|
| 1035790 | 7/1966 | United Kingdom | 260/879 |

*Primary Examiner*—William F. Hamrock
*Attorney, Agent, or Firm*—Frank M. Van Riet

[57] ABSTRACT

A vulcanizable polyacrylate elastomer composition having improved resistance to hydrocarbon oils is provided which comprises one or more lower alkyl acrylic acid ester monomers polymerized with a comonomer containing either a halogen or an epoxy group, in the presence of from about 0.25 to 10 percent, by weight of total monomer, of a low molecular weight, unsaturated polymer of butadiene or isoprene or copolymers thereof with styrene or acrylonitrile. In addition, a process for preparing such elastomer compositions is also provided, together with the vulcanization of such elastomers and the resulting vulcanized polyacrylate.

18 Claims, No Drawings

POLYACRYLATE ELASTOMER COMPOSITIONS

CROSS REFERENCE TO RELATED APPLICATIONS

This is a continuation of application Ser. No. 788,172, filed Apr. 18, 1977 which, in turn, is a continuation of application Ser. No. 683,610, filed May 5, 1876, now abandoned, which in turn is a continuation of appln. Ser. No. 615,873, filed Sept. 22, 1975, now abandoned, which in turn is a continuation of appln. Ser. No. 452,318, filed Mar. 18, 1974, now abandoned, which in turn is a continuation of appln. Ser. No. 287,305, filed Sept. 8, 1972, now abandoned, which in turn, is a continuation-in-part of appln. Ser. No. 119,963 filed Mar. 1, 1971, now abandoned.

Generally stated the subject matter or the present invention relates to improved polyacrylate elastomer compositions. More particularly, the invention relates to vulcanizable polyacrylate elastomer compositions which have improved resistance to degradation by hydrocarbon oils, and to a process for preparing such compositions.

BACKGROUND OF THE INVENTION

Polyacrylate elastomers are well known specialty elastomers having extensive utility in the automative industry as gasketing material, oil seals, O-rings, transmissions seals, and the like. In effect such elastomers are employed where resistance to hot oil is important and in such usage the retention of physical properties is of paramount importance.

There are available a number of polyacrylate elastomers finding use in the automotive industry and other industries. Note U.S. Pat. No. 3,201,373, Kaizerman, which discloses polyacrylate elastomers derived from copolymerization of a major proportion of a lower alkyl acrylate with vinyl chloroacetate. Similarly, P. Fram in the Encyclopedia of Polymer Science and Technology 1, 226 (1964) describes polyacrylates wherein other halogen containing comonomers, such as vinyl chloroethyl ether, are copolymerized with alkyl acrylates. Polyacrylates are described which are composed of, in addition to alkyl acrylates, alkoxy-alkyl acrylates, cyanoalkyl acrylates and alkylthioalkylacrylates. Note U.S. Pat. No. 3,450,681, Gobran et al, and U.S. Pat. No. 3,488,331, Joregenson. The status of vulcanizable polyacrylate elastomers up to the present time is reviewed by T. M. Vial in Rubber Chemistry and Technology, "Rubber Reviews", April, 1977. These elastomers are vulcanizable by a variety of means which is also summarized in the article.

The property of acrylate elastomers which is probably most important in their application is oil resistance, a term encompassing several properties, including volume swell and retention of physical properties after exposure to hot oil for a period of time. This exposure usually involves softening, loss of modulus and gain in elongation due to plasticizing or the swelling action of the oil, as well as thermal degradation.

However, in spite of the generally favorable oil resistance of polyacrylate elastomers there is always a search for means whereby oil resistance can be improved to obtain longer life in service. Anything which provides better retention of properties on exposure to hot oil, other things being equal, is desirable. The present invention represents the culmination of a series of investigations conducted largely by the inventors and their associates directed to improving the oil resistance of polyacrylate elastomers.

Accordingly, it is a primary object of the present invention to provide vulcanizable polyacrylate elastomer compositions having improved resistance to hydrocarbon oils.

Another object of the present invention is to provide a method for improving the oil resistance of vulcanizable polyacrylate elastomer compositions.

It is a further object of the present invention to provide a vulcanized elastomer having improved resistance to hydrocarbon oils.

Generally then, it is an object of this invention to provide an improved vulcanized elastomer which retains its physical properties when employed in a hot oil environment. This retention results in a significant lengthening of the service life of materials prepared from such elastomers.

Additional objects and advantages of the invention will be set forth in part in the description which follows, and in part will be obvious from the description, or may be realized by practice of the invention, the objects and advantages being realized and attained by means of the methods, processes, instrumentalities and combinations particularly pointed out in the appended claims.

THE INVENTION

To achieve the forgoing objects, and in accordance with its purpose, as embodied and broadly described in the present invention relates to vulcanizable polyacrylate elastomer compositions having improved resistance to hydrocarbon oils which comprises a polymer of at least one acrylic acid ester monomer co-polymerized with a monomer containing a halogen or an epoxy group, in the presence of from about 0.25 to 10 percent, by weight of total monomer, of a low molecular weight, unsaturated polymer of butadiene or isoprene or copolymers thereof with styrene or acrylonitrile.

The present invention further provides a method for preparing a vulcanizable polyacrylate elastomer having improved resistance to hydrocarbon oils.

In addition, the invention also provides a vulcanized elastomer having improved resistance to hydrocarbon oils.

The invention consists of the novel methods, processes, steps and improvements herein shown and described. In addition, it should also be understood that both the foregoing general description and the following detailed description are exemplary and explanatory and are not restrictive of the invention.

In essence, the present invention resides in the discovery that the polymerization of an acrylic acid ester and a comonomer containing either a halogen or epoxy group, in the presence of an unsaturated, low molecular weight polymer will result in vulcanizable polyacrylate elastomers having an improved resistance to hydrocarbon oils. This result is clearly surprising and wholly unexpected, since the art is devoid of any teaching which discloses or suggests this improvement in oil resistance. In fact it would be reasonable to conclude that the opposite effect would result, since such low molecular weight polymeric hydrocarbons are notorious for having little to no oil resistance.

The polymers are viscous liquids having a molecular weight of from about 500 to 4000. They are hydroxyl or aromatic hydrocarbon terminated homopolymers of butadiene or isoprene or copolymers thereof with minor amounts of styrene or acrylonitrile. Based on the monomeric butadiene or isoprene in the polymer, the unsaturation is about 75% to 99%; most of the unsaturation is vinyl and trans-1,4, with small amounts of the unsaturation internally cyclized. Examples of such polymer are described in Product Bulletin No. 154–570 and No. 155–570, Lithinum Corp. of America, and Research Bulletin No. 508, Poly R-D, Sinclair Petrochemicals, Oct. 1, 1968.

The acrylic acid ester component of the composition comprises one or more lower alkyl acrylates, that is, esters of acrylic acid and alcohols containing from about 1 to 8 carbon atoms, such as methyl, ethyl, n-butyl, n-hexyl, 2-ethylhexyl and n-octylacrylates, and the like. Also suitable are the alkoxyethyl and alkylthioethyl acrylates having the structural formula:

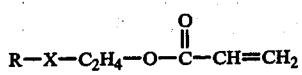

wherein R is lower alkyl containing from 1 to 8 carbon atoms, particularly methyl or ethyl, and X is oxygen or sulfur. Other useful monomers include cyanoalkyl acrylates and cyanoalkoxyalkyl acrylates having the formulae:

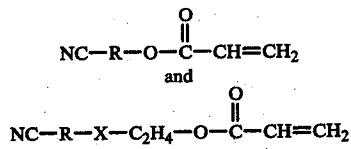

wherein R is a straight or branced chain alkylene radical containing from 2 to 8 carbon atoms and X is oxygen or sulfur.

The halogen or epoxy containing comonomers useful in providing the vulcanization sites in the polyacrylates include, for example, 2-chloroethyl vinyl ether, vinyl chloroacetate, 2-chloroethyl acrylate; compounds having the formulas:

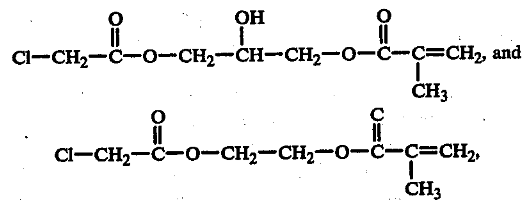

allyl glycidyl ether, glycidyl methacrylate, and the like.

Normally the halogen or epoxy containing monomer represents a minor proportion of the total monomer mixture, for example, up to about 10% by weight. The remainder of the monomer mixture contains either a single ester of acrylic acid, for example, ethyl acrylate, a mixture of acrylic esters, such as ethyl and butyl acrylate, or a mixture of one or more alkyl acrylates and an alkoxyethyl acrylate, alkylthioethylacrylate or a cyanoalkylacrylate or cyanoalkoxyalkyl acrylate. The preferred compositions for the purposes of this invention contain either ethyl acrylate copolymerized with vinyl chloroacetate, a mixture of ethyl and butyl acrylate copolymerized with vinyl chloroacetate, mixtures of ethyl acrylate, butyl acrylate and methoxy - or ethoxyethyl acrylate with vinyl chloroacetate, or mixtures of ethyl acrylate, butyl acrylate and cyanoethyl acrylate with vinyl chloroacetate. Optionally, in addition to the esters of acrylic acid described and the halogen or epoxy monomer, there can be used minor amounts of other co-polymerizable monomers, e.g. acrylonitrile.

The present invention may also be generally described as a conventional emulsion or suspension polymerization of one or more esters of acrylic acid, with a comonomer containing a halogen or epoxy group in the presence of a low molecular weight, unsaturated hydrocarbon polymer.

The copolymerization, whether by emulsion or suspension techniques, is conducted using a conventional free radical catalyst, such as benzoyl peroxide, dicumyl peroxide, azobisisobutyronitrile, or a redox system, in the presence of a small amount, from about 0.25 to 10 percent of an unsaturated low molecular hydrocarbon weight polymer.

While a butadiene or isoprene polymer may be incorporated into the polyacrylate by blending, for example on a rubber mill, it is not as effective in providing improved oil resistance, although some improvement is obtained.

The polyacrylate elastomers containing the low molecular weight unsaturated hydrocarbon polymer are compounded in conventional manner with carbon black or other fillers, vulcanizing agents, accelerators, antioxidants, and the like, and vulcanized. Best results are obtained if the compositions are vulcanized in accordance with the procedures set forth in U.S. Pat. No. 3,458,461, Mihal and U.S. Pat. No. 3,506,624, Behrens. However, the polymers may be cured using other systems known to those skilled in the art, such as by the use of ammonium salts, and the like.

The following examples are provided for illustrative purposes and they may include particular features of the invention. However, the examples should not be construed as limiting the invention, many variations of which are possible without departing from the spirit or scope thereof.

EXAMPLE I

Preparation of Polymer

To a stirred suspension system comprising 150 parts water, 6.5 parts tricalcium phosphate and 3.5 parts Bentonite clay was added a solution comprising 71.75 parts ethyl acrylate, 15.6 parts vinyl chloroacetate, 0.04 parts dodecyl mercaptan and 0.1 part azobisisobutyronitrile. A solution comprising 256.5 parts ethyl acrylate, 5.25 parts vinyl chloroacetate, 0.056 part dodecyl mercaptan and 3.75 parts ARCO R-15M Resin (a low molecular weight polybutadiene) dissolved in 3 parts ethyl acrylate was added to the above mixture over a period of one hour. The polymerization reaction was maintained at about 80° C., and the mixture was stirred for an additional 30 minutes after all monomers were added. The reaction mixture was then steam distilled to remove unreacted monomers and the polymer was filtered, washed and dried.

EXAMPLE II

This example demonstrates the effectiveness of the use of a small amount of polybutadiene to improve te high temperature oil aging properties of an acrylic elastomer.

| | Parts by Weight | |
|---|---|---|
| | A | B |
| Polymer A[1] | 100 | — |
| Polymer B[2] | — | 100 |
| Carbon black (FEF) | 60 | 60 |
| PBNA[3] | 2 | 2 |
| Stearic acid | 1 | 1 |
| Sulfur | 0.2 | 0.2 |
| HVA No. 2[4] | 0.75 | 0.75 |
| Sodium Caprylate | 4 | 4 |

[1]94% ethyl acrylate - 6% vinyl chloroacetate
[2]Same as Polymer A, but prepared in presence of 1% by weight polybutadiene (ARCO R-15M Resin-Sinclair Petrochemicals, Inc.)
[3]Phenyl-beta naphthylamine
[4]m-phenylenebismaleimide The above compositions were mixed in conventional manner on a two-roll mill, as set forth in U.S. Pat. No. 3,506,624, Behrens, for 10 minutes at 330° F. and post-cured for 4 hours at 176° C. Physical properties are shown in Table 1.

TABLE 1

| | A | B |
|---|---|---|
| Modulus at 100%, psi | 1400 | 1500 |
| Tensile, psi | 1865 | 1735 |
| Elongation at break, % | 150 | 120 |
| Shore A hardness | 79 | 79 |

The compositions were then aged for 2 weeks at 176° C. in ASTM No. 3 oil and retested. Oil aging is conducted in accordance with ASTM D471 at 176° C. Resistance to oil is manifested by retention of physical properties after aging. Data are shown in Table 2.

TABLE 2

| | A | B |
|---|---|---|
| Modulus at 100%, psi | 760 | 1420 |
| Tensile, psi | 1660 | 2150 |
| Elongation at break, % | 230 | 140 |
| Shore A hardness | 62 | 64 |

These data demonstrate the improvement, retention of original properties, of Composition B versus Composition A.

EXAMPLE III

| | Parts by Weight |
|---|---|
| Polymer[1] | 100 |
| Carbon black (FEF) | 60 |
| PBNA | 2 |
| Stearic Acid | 1 |
| Sulfur | 0.25 |
| Sodium oleate | 4 |

[1]94% ethyl acrylate - 6% vinyl chloroacetate prepared in presence of 10% by weight of polybutadiene (ARCO R-15M Resin-Sinclair Petrochemicals, Inc.)

The above formulation was compounded on a standard rubber mill and cured at 330° F. for 10 minutes; post-cured 4 hours at 176° C. Properties are shown in Table 3.

TABLE 3

| | |
|---|---|
| Modulus at 100%, psi | 1040 |
| Tensile, psi | 1955 |
| Elongation at break, % | 160 |
| Shore A hardness | 65 |

After aging the above compositions for 2 weeks at 176° C. in ASTM No. 3 oil, they exhibited the properties shown in Table 4.

TABLE 4

| | |
|---|---|
| Modulus at 100%, psi | 900 |
| Tensile, psi | 1340 |
| Elongation at break, % | 130 |
| Shore A hardness | 57 |

Retention of properties after aging is shown to be improved to nearly the same degree as polybutadiene used at a level of 1%.

EXAMPLE IV

| | Parts by Weight | | | |
|---|---|---|---|---|
| | A | B | C | D |
| Polymer A[1] | 100 | 100 | — | — |
| Polymer B[2] | — | — | 100 | 100 |
| | **Parts by Weight** | | | |
| | A | B | C | D |
| Carbon black (FEF) | 60 | 60 | 60 | 60 |
| Antioxidant[3] | 2 | 2 | 2 | 2 |
| Stearic Acid | 1 | 1 | 1 | 1 |
| Sulfur | 0.2 | 0.2 | 0.2 | 0.2 |
| Sodium caprylate | 4 | 4 | 4 | 4 |

[1]94%-(82% ethyl acrylate - 18% butyl acrylate) -6% vinyl chloroacetate; Composition B prepared in presence of 1% by weight polybutadiene (ARCO R15M Resin-Sinclair Petrochemicals, Inc.)
[2]94%-(50% ethyl acrylate - 50% methoxyethylacrylate) -6% vinyl chloroacetate. Composition D prepared in presence of 1% polybutadiene (ARCO %-15M Resin-Sinclair Petrochemicals, Inc.)
[3]Di-beta-naphthyl-p-phenylene diamine The compositions were compounded on a standard rubber mill and cured for 15 minutes at 330° F.; post-cured for 4 hours at 176° C. They exhibited the properties shown in Table 5.

TABLE 5

| | A | B | C | D |
|---|---|---|---|---|
| Modulus at 100%, psi | 975 | 1000 | 995 | 1410 |
| Tensile, psi | 1735 | 1980 | 1840 | 2000 |
| Elongation at break, % | 160 | 160 | 170 | 135 |
| Shore A hardness | 75 | 68 | 68 | 72 |

Following oil aging for 2 weeks at 176° C. in ASTM No. 3 oil they showed the properties in Table 6.

TABLE 6

| | A | B | C | D |
|---|---|---|---|---|
| Modulus at 100%, psi | 300 | 460 | 450 | 760 |
| Tensile, psi | 1210 | 1550 | 1425 | 1725 |
| Elongation at break,% | 385 | 230 | 235 | 180 |
| Shore A hardness | 44 | 44 | 48 | 61 |

Compositions B and D show greater retention of properties after aging in hot oil than A and C, respectively, which are of similar composition without the improvement of this invention.

EXAMPLE V

| | Formulation (parts by weight) | | |
|---|---|---|---|
| | A | B | C |
| Polymer[1] | 100 | 100 | 100 |
| Carbon black (FEF) | 60 | 60 | 60 |
| Stearic acid | 1 | 1 | 1 |
| sulfur | 0.25 | 0.25 | 0.25 |
| Sodium caprylate | 4 | 4 | 4 |

[1]94% - ethyl acrylate - 6% vinyl chloroacetate; composition B prepared in presence of 1% by weight of Lithene AM and composition C in the presence of 1% by weight of Lithene PM (both polybutadienes - Lithium Corp. of America) The above formulations were compounded on a standard rubber mill and cured for 10 minutes at 330° F; post-cured for 4 hours at 176° C. They exhibited the properties shown in Table 7.

The above formulations were compounded on a standard rubber mill and cured for 10 minutes at 330° F.; post-cured for 4 hours at 176° C. They exhibited the properties shown in Table 7.

TABLE 7

| | A | B | C |
|---|---|---|---|
| Modulus at 100%, psi | 1750 | 1850 | 1775 |
| Tensile, psi | 1985 | 2050 | 1825 |
| Elongation at break, 1% | 110 | 100 | 100 |
| Shore A hardness | 73 | 75 | 81 |

Following aging at 176° C. for 2 weeks in ASTM No. 3 oil the compositions exhibited the properties shown in Table 8.

TABLE 8

| | A | B | C |
|---|---|---|---|
| Modulus at 100%, psi | 375 | 750 | 875 |
| Tensile, psi | 1475 | 1875 | 1700 |
| Elongation at break, % | 340 | 190 | 165 |
| Shore A hardness | 53 | 58 | 61 |

Compositions B and C show greater retention of properties than Composition A.

EXAMPLE VI

| | Parts by Weight | | | |
|---|---|---|---|---|
| | A | B | C | D |
| Elastomer A[1] | 100 | 100 | — | — |
| Elastomer B[2] | — | — | 100 | 100 |
| Carbon black | 60 | 60 | 60 | 60 |
| Stearic acid | 1 | 1 | 1 | 1 |
| Sulfur | 0.25 | 0.25 | 0.25 | 0.25 |
| Sodium Caprylate | 4 | 4 | 4 | 4 |
| Antioxidant[3] | 2 | 2 | 2 | 2 |

[1]94% - (50% ethyl acrylate - 25% butyl acrylate - 25% methoxymethyl acrylate) - 6% vinyl chloroacetate; composition B prepared in presence of 1% by weight of ARCO R-15 M Resin.
[2]97% - (50% ethyl acrylate - 25% butyl acrylate - 25% ethoxyethyl acryate) - 3% vinyl chloroacetate; composition D prepared in presence of 1% by weight ARCO R-15M Resin.
[3]Di-beta naphthyl-p-phenylene diamine.

The compositions were mixed on a standard rubber mill and cured for 15 minutes at 330° F. Post-cured for 4 hours at 176° C. They exhibited the properties shown in Table 9.

TABLE 9

| | A | B | C | D |
|---|---|---|---|---|
| Modulus at 100%, psi | 1255 | 1340 | 800 | 850 |
| Tensile, psi | 1875 | 1945 | 1640 | 1735 |
| Elongation at break, % | 130 | 140 | 190 | 180 |
| Shore A hardness | 70 | 71 | 68 | 70 |

Following aging for 2 weeks at 176° C. in ASTM No. 3 oil they exhibited the properties shown in Table 10.

TABLE 10

| | A | B | C | D |
|---|---|---|---|---|
| Modulus at 100%, psi | 460 | 705 | 350 | 590 |
| Tensile, psi | 1380 | 1625 | 1200 | 1330 |
| Elongation at break, % | 260 | 190 | 310 | 180 |
| Shore A hardness | 48 | 53 | 45 | 50 |

Compositions B and D show greater retention of original properties following oil aging than either of compositions A and C.

What is claimed is:

1. A vulcanizable polyacrylate elastomer composition having improved resistance to hydrocarbon oils which comprises one or more lower alkyl acrylic acid ester monomers copolymerized with a monomer selected from the group consisting of β-chloroethyl vinyl ether, vinyl chloroacetate, β-chloroethyl acrylate, allyl glycidyl ether, glycidyl methacrylate and compounds having the formulae

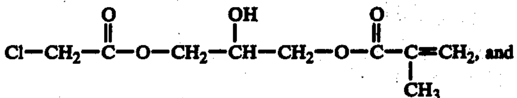

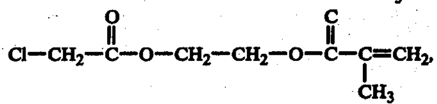

in the presence of from about 0.25 to 10 percent, by weight, of total monomer, of a liquid unsaturated, hydroxyl or aromatic hydrocarbon terminated homopolymer of butadiene or isoprene, or copolymers thereof with minor amounts of styrene or acrylonitrile, having a monomeric weight of from about 500 to 4,000 and containing from about 75% to 99% unsaturation, based on the monomeric butadiene or isoprene in the polymer.

2. A composition according to claim 1 wherein the low molecular weight polymer is polybutadiene.

3. A composition according to claim 1 wherein the low molecular weight polymer is polyisoprene.

4. A composition according to claim 1 wherein the low molecular weight polymer comprises a major proportion of butadiene and a minor proportion of acrylonitrile or styrene.

5. A composition according to claim 1 wherein the acrylic acid ester monomer is a lower alkyl acrylate containing from 1 to 8 carbon atoms in the alkyl group.

6. A composition according to claim 1 which comprises in addition to at least one or more lower alkyl acrylic acid esters a monomer which is an alkoxyethyl acrylate or an alkylthioethyl acrylate having the general formula:

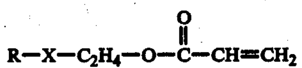

wherein R is lower alkyl and X is oxygen or sulfur.

7. A composition according to claim 1 which comprises in addition to at least one or more lower alkyl acrylic acid esters a monomer which is a cyanoalkyl acrylate or a cyanoalkoxyalkyl acrylate having the general formulae:

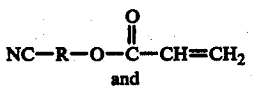

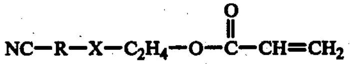

wherein R is a straight or branched chain alkylene radical containing from 2 to 8 carbon atoms and X is oxygen or sulfur.

8. A composition according to claim 1 wherein the halogen or epoxy containing comonomer comprises a minor proprotion of the total monomer mixture.

9. A composition according to claim 1 wherein the halogen or epoxy containing comonomer comprises up to about 10 percent by weight of the total monomer mixture.

10. A composition according to claim 1 wherein the total monomer comprises ethyl acrylate with vinyl chloroacetate, a mixture of ethyl and butyl acrylate with vinyl chloroacetate or mixtures of ethyl acrylate, butyl acrylate and methoxy or ethoxy-ethyl acrylate with vinyl chloroacetate.

11. A method for preparing the vulcanizable polyacrylate elastomer of claim 1 which comprises polymerizing an ester of an acrylic acid with a comonomer selected from the group consisting of β-chloroethyl vinyl ether, vinyl chloroacetate, β-chloroethyl acrylate, allyl glycidyl ether, glycidyl methacrylate and compounds having the formulae

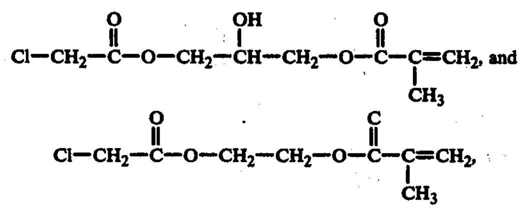

in the presence of a liquid unsaturated, hydroxyl or aromatic hydrocarbon terminated homopolymer of butadiene or isoprene, or copolymers thereof with minor amounts of styrene or acrylonitrile, having a monomeric weight of from about 500 to 4,000 and containing from about 75% to 99% unsaturation, based on the monomeric butadiene or isoprene in the polymer.

12. A method according to claim 11 wherein the polymerization technique is emulsion polymerization.

13. A method according to claim 11 wherein the polymerization technique is suspension polymerization.

14. A method according to claim 11 wherein polymerization is conducted in the presence of a conventional free radical cayalyst in an amount sufficient to catalyze polymerization.

15. A method according to claim 14 wherein the catalyst is benzoyl peroxide, dicumyl peroxide or azobisisobutyronitrile.

16. A method according to claim 11 wherein polymerization is conducted in the presence of a redox catalyst system in an amount sufficient to catalyze polymerization.

17. A method according to claim 11 wherein the resulting polymer is vulcanized.

18. A vulcanized polyacrylate elastomer having improved resistance to hydrocarbon oils prepared according to the process of claim 17.

* * * * *

UNITED STATES PATENT OFFICE
CERTIFICATE OF CORRECTION

Patent No. 4,129,708 Dated December 12, 1978

Inventor(s) GUIDO MINO, RUDOLF ADOLF BEHRENS

It is certified that error appears in the above-identified patent and that said Letters Patent are hereby corrected as shown below:

Claim 1, Line 12:

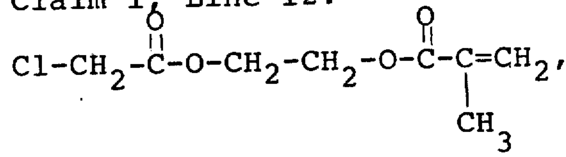

Claim 11, Line 20:

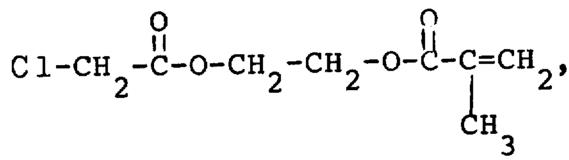

Signed and Sealed this

*Tenth* Day of *April 1979*

[SEAL]

*Attest:*

RUTH C. MASON
*Attesting Officer*

DONALD W. BANNER
*Commissioner of Patents and Trademarks*